United States Patent
Sulaiman et al.

(10) Patent No.: US 12,023,817 B1
(45) Date of Patent: Jul. 2, 2024

(54) SYSTEM AND METHOD FOR A SLIDE MARKING TECHNIQUE FOR TARGET TISSUE EXTRACTION AND DOWNSTREAM APPLICATION

(71) Applicant: Pramana Inc., Cambridge, MA (US)

(72) Inventors: Mohammad Abdul Sulaiman, Andhra Pradesh (IN); Omkar Appasaheb Kabadagi, Bangalore Karnataka (IN); Vaishnavi K B, Cambridge, MA (US); Prasanth Perugupalli, Cary, NC (US); Rameesh Varshan, Tamil Nadu (IN); Manish Shiralkar, Maharashtra (IN)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 18/389,291

(22) Filed: Nov. 14, 2023

(51) Int. Cl.
*B25J 9/16* (2006.01)
*G01N 1/31* (2006.01)
(Continued)

(52) U.S. Cl.
CPC ............ *B25J 9/1692* (2013.01); *G01N 1/312* (2013.01); *G06T 7/337* (2017.01); *G06T 7/80* (2017.01);
(Continued)

(58) Field of Classification Search
CPC ........ B25J 9/1692; G01N 1/312; G06T 7/337; G06T 7/80; G06T 2207/10056;
(Continued)

(56) References Cited

U.S. PATENT DOCUMENTS 5,072,382 A * 12/1991 Kamentsky .......... G01N 15/147
382/133
5,235,522 A * 8/1993 Bacus ....................... G06T 7/62
702/19
(Continued)

OTHER PUBLICATIONS

Oscar Deniz, Marcial Garcia-Rojo, Automatic Handling of Tissue Microarray Cores in High-Dimensional Microscopy Images, IEEE Journal of Biomedical and Health Informatics, vol. 18, No. 3, May 2014.
(Continued)

*Primary Examiner* — Bhavesh V Amin
(74) *Attorney, Agent, or Firm* — Caldwell Intellectual Property Law

(57) ABSTRACT

A system for slide marking technique for target tissue extraction and downstream application includes at least a marking device configured to receive a sample associated with a stained slide, to image an unstained surface of the sample associated with the stained slide, and to mark a region of interest on the sample. The system includes at least a computing device comprising at least a processor and a memory, the computing device configured to receive a stained slide image, the computing device configured to receive the image of the unstained surface of the sample, the computing device configured to determine a geometric registration of the unstained surface of the sample to the stained slide image, wherein determining the geometric registration comprises aligning the stained slide image with the image of the unstained surface, the computing device configured to determine the annotation mask as a function of the geometric registration.

20 Claims, 10 Drawing Sheets

(51) Int. Cl.
  *G06T 7/33* (2017.01)
  *G06T 7/80* (2017.01)
  *G06V 20/69* (2022.01)
  *G06V 20/70* (2022.01)

(52) U.S. Cl.
  CPC .......... *G06V 20/695* (2022.01); *G06V 20/698* (2022.01); *G06V 20/70* (2022.01); *G06T 2207/10056* (2013.01); *G06T 2207/20081* (2013.01); *G06T 2207/30024* (2013.01); *G06T 2207/30096* (2013.01); *G06T 2207/30204* (2013.01)

(58) Field of Classification Search
  CPC . G06T 2207/20081; G06T 2207/30024; G06T 2207/30096; G06T 2207/30204; G06V 20/695; G06V 20/698; G06V 20/70
  See application file for complete search history.

(56) References Cited

U.S. PATENT DOCUMENTS

| | | | | |
|---|---|---|---|---|
| 5,321,520 A * | 6/1994 | Inga | ............ | G16H 40/67 358/1.9 |
| 5,619,428 A * | 4/1997 | Lee | ............ | G01N 1/312 382/128 |
| 5,793,969 A * | 8/1998 | Kamentsky | ............ | G16H 10/40 359/368 |
| 6,252,979 B1 * | 6/2001 | Lee | ............ | G06V 20/69 382/133 |
| 6,466,690 B2 * | 10/2002 | Bacus | ............ | G16B 40/00 382/128 |
| 6,581,012 B1 * | 6/2003 | Aryev | ............ | G05B 19/41865 702/22 |
| 6,800,249 B2 * | 10/2004 | de la Torre-Bueno | .. | G01N 1/31 382/128 |
| 7,027,633 B2 * | 4/2006 | Foran | ............ | G16H 80/00 128/920 |
| 7,133,543 B2 * | 11/2006 | Verwoerd | ............ | G06T 7/0012 382/128 |
| 7,171,030 B2 * | 1/2007 | Foran | ............ | G06T 7/00 382/128 |
| 7,194,118 B1 * | 3/2007 | Harris | ............ | G06V 20/693 600/478 |
| 7,226,788 B2 * | 6/2007 | De La Torre-Bueno | ............ | G01N 1/31 382/128 |
| 7,292,251 B1 * | 11/2007 | Gu | ............ | G06T 9/00 382/128 |
| 7,518,652 B2 * | 4/2009 | Olson | ............ | G02B 21/365 359/383 |
| 7,792,338 B2 * | 9/2010 | Bacus | ............ | G02B 21/367 382/128 |
| 8,036,868 B2 * | 10/2011 | Zeineh | ............ | G16H 10/40 382/128 |
| 8,067,245 B2 * | 11/2011 | van Ryper | ............ | G01N 1/312 422/65 |
| 8,094,914 B2 * | 1/2012 | Iki | ............ | G02B 21/367 382/294 |
| 8,463,741 B2 * | 6/2013 | Ehlke | ............ | G16H 15/00 705/2 |
| 8,996,570 B2 * | 3/2015 | Stratman | ............ | G06Q 10/06 382/128 |
| 9,588,329 B2 * | 3/2017 | Sieckmann | ............ | G16H 10/40 |
| 9,818,190 B2 | 11/2017 | Chukka et al. | | |
| 10,139,613 B2 * | 11/2018 | Hing | ............ | G02B 21/367 |
| 10,503,868 B2 | 12/2019 | Chukka et al. | | |
| 10,906,894 B2 * | 2/2021 | Mansour | ............ | A61P 43/00 |
| 10,977,791 B2 | 4/2021 | Chukka et al. | | |
| 11,358,956 B2 * | 6/2022 | Chafeev | ............ | A61K 31/506 |
| 2004/0009098 A1 * | 1/2004 | Torre-Bueno | ............ | G01N 1/312 422/63 |
| 2005/0282292 A1 * | 12/2005 | Torre-Bueno | ............ | G01N 1/31 436/180 |

OTHER PUBLICATIONS

Komura et al, Restaining-based annotation for cancer histology segmentation to overcome annotation-related limitations among pathologists, Patterns 4, 100688 Feb. 10, 2023.

* cited by examiner

SYSTEM AND METHOD FOR A SLIDE MARKING TECHNIQUE FOR TARGET TISSUE EXTRACTION AND DOWNSTREAM APPLICATION

FIELD OF THE INVENTION

The present invention generally relates to the field of molecular diagnostic. In particular, the present invention is directed to a system and method for a slide marking technique for target tissue extraction and downstream application.

BACKGROUND

In modern diagnostic and research settings, harvesting disease tissues, especially tumor tissues from slides has posed significant challenge. Process that demands extreme precision to ensure that the correct tissue type or tumor section is harvested. However, achieving such precision is difficult. Current techniques often fall short in accurately targeting the desired location, amount, and size of the tissue. This inaccuracy not only compromises the quality and quantity of the harvested genetic material but can also lead to misrepresentations in subsequent analyses. Furthermore, any inconsistencies or errors in tissue extraction can result in the need for repetitive procedures, wasting sample material and potentially leading to inconclusive or erroneous results.

SUMMARY OF THE DISCLOSURE

In an aspect, a system for a slide marking technique for target tissue extraction and downstream application is described. The system includes at least a marking device, wherein the at least a marking device is configured to receive a sample associated with a stained slide, wherein the at least a marking device is configured to image an unstained surface of the sample associated with the stained slide, wherein the at least a marking device is configured to mark an region of interest on the sample, as a function of an annotation mask. The system includes at least a computing device comprising at least a processor and a memory, the computing device configured to receive a stained slide image, the computing device configured to receive the image of the unstained surface of the sample, the computing device configured to determine a geometric registration of the unstained surface of the sample to the stained slide image, wherein determining the geometric registration comprises aligning the stained slide image with the image of the unstained surface, the computing device configured to determine the annotation mask as a function of the geometric registration.

In another aspect, a method for a slide marking technique for target tissue extraction and downstream application is described. The method includes receiving, using at least a marking device, a sample associated with a stained slide, imaging, using the at least a marking device, an unstained surface of the sample associated with the stained slide, marking, using the at least a marking device, an region of interest of the sample, as a function of an annotation mask, receiving, using at least a computing device, a stained slide image, receiving, using the at least a computing device, the image of the unstained surface of the sample, determining, using the at least a computing device, a geometric registration of the unstained surface of the sample to the stained slide image, wherein determining the geometric registration comprises aligning the stained slide image with the image of the unstained surface, and determining, using the at least a computing device, the annotation mask as a function of the geometric registration.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a slide marking technique for target tissue extraction and downstream application. In an embodiment, at least a marking device further includes a manipulator configured to hold the sample with an end effector.

Aspects of the present disclosure can be used to automate the precision marking of specific regions on glass slides with unstained tissue samples, ensuring accurate identification of areas of interest or anomalies. Aspects of the present disclosure can also be used to increase the throughput and consistency of sample processing in laboratories, reducing the potential for human error. This is so, at least in part, because the system employs robotic mechanisms combined with advanced algorithms to determine the exact location and area to be marked, optimizing the process and reducing variability that might arise from manual marking.

Figure 1:
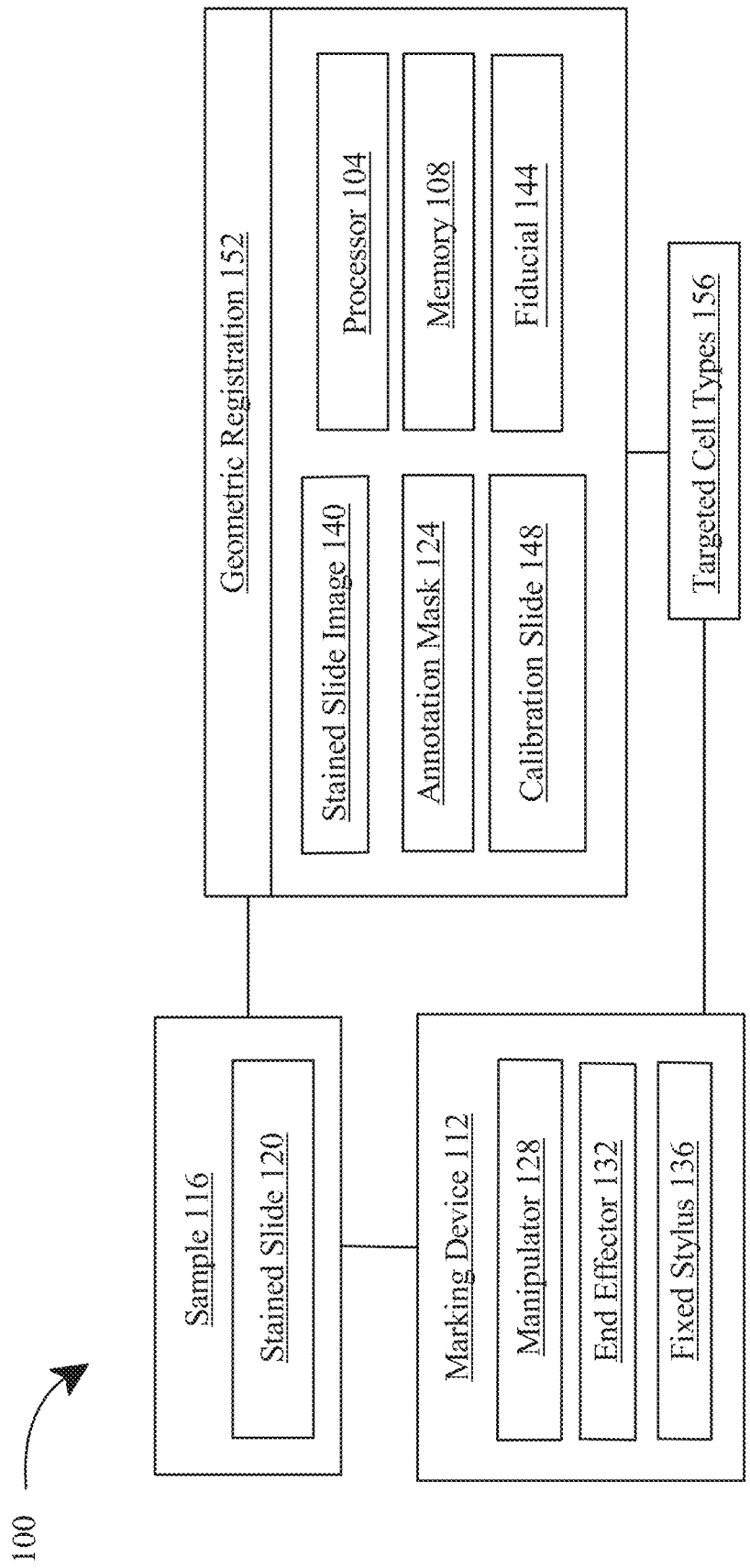
FIG. 1 block diagram of an exemplary embodiment of a system and method for a slide marking technique for target tissue extraction and downstream application.

Referring now to FIG. 1, an exemplary embodiment of a system 100 for a slide marking technique for target tissue extraction and downstream application is illustrated. System includes a computing device. Computing device includes a processor 104 communicatively connected to a memory 108. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, an apparatus 100 includes a memory 108 communicatively connected to at least a processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, system 100 and/or computing device may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

With continued reference to FIG. 1, system 100 may include at least a marking device 112. As used in this disclosure, a "marking device" is a system, tool or apparatus designed to inscribe or trace a region of interest on a surface. Examples of marking device include, but are not limited to, manipulators, robot arms, and styluses. For instance, a stylus may be held within a robot arm to trace the region of interest, or conversely, the stylus might remain stationary while the slide or sample moves beneath it, facilitated by a table capable of sliding in both x and y directions. When marking is required, the stylus is lowered to the table to inscribe the specified region on the slide. Another possibility could be using specialized laser markers or inkjet mechanisms, or other advanced inscription methods. An "region of interest" refers to, as used in this disclosure, a specific location or region within a sample or specimen that may draw particular attention due to its significance, relevance, or unique characteristics. In a non-limiting example, the region of interest may be an area exhibiting disease or pathology, a tumor or neoplastic grown, a marked region on a patient's skin, a segment of tissue undergoing abnormal cellular changes, A lesion or area of inflammation, and the like. A "surface," as used in this disclosure, refers to any flat area, such as, but not limited to, the face of a specimen, particularly in the context of biological samples or slide, that may be presented for visual examination, image, or analysis.

With continued reference to FIG. 1, the at least a marking device 112 is configured to receive a sample 116 associated with a stained slide 120. As used in this disclosure, a "sample" is material or preparation obtained or derived from biological, clinical, or environmental sources, which may be presented in a form suitable for examination, analysis, or processing. Sample 116 encompasses, but is not limited to, slides, histological preparations, paraffin-embedded blocks, and other substrates onto which specimens are affixed or registered for further study or analysis. As used in this disclosure, a "stained slide" refers to a prepared thin section or specimen, for example, a biological origin, which has undergone a treatment process with one or more coloring agents or dyes to enhance the visibility, contrast, or differentiation of its components or structures. Examples may include, but are not limited to, slides treated with Hematoxylin and Eosin (H&E), among other stained methodologies, to highlight specific cellular and tissue features, includes but not limited to, cell nuclei, extracellular matrix, and cytoplasm, etc. To provide further examples on slide preparation, a paraffin block approach may involve embedding tissue samples in paraffin wax to facilitate thin slicing. Beyond the paraffin embedding method, other slide preparation processes include, without limitation, frozen section, where tissue samples are rapidly frozen and then sliced thin using a cryostat and plastic embedding, which involves embedding tissue samples in plastic resins.

With continued reference to FIG. 1, at least a marking device 112 is further configured to image an unstained surface of sample 116 associated with stained slide 120. In some embodiment, imaging the unstained surface includes capturing a macro image. As used in this disclosure, "unstained" refers to slides, samples, or other substrates derived from biological, clinical, or environmental origins that have not undergone additional processing, treatment, or alteration with coloring agents, dyes, or other chemical modifications. For example, samples can include, but are not limited to, freshly excised specimens, cryogenically preserved samples without prior staining, and any other samples that retain their native or original appearance post-collection. As used in this disclosure, a "high magnification image" refers to an image captured using an enhanced scale or magnification level, typically with the aid of microscopy or similar techniques, designed to provide detailed visualization of fine structures, features, or abnormalities within a specimen. For example, but not limited to, an optical microscope or a light microscope, commonly uses visible like and a system of lenses to generate magnified images of small samples. As used in this disclosure, a "macro image" refers to an image captured at a scale designed to encompass the entirety or a large portion of a specimen within a single view, often using microscopy or related imaging techniques. As a non-limiting example, an optical microscope with a high magnification of 40× may be employed to capture entire-slide images of H&E-stained slides that might encompass regions of interest, such as tumors. This high magnification may offer detailed insights into tumor morphology, revealing distinct patterns that differentiate from regular cells. Such clarity enhances the ease of identification and annotation of the regions of interest. In another non-limiting example, the objective lenses of the optical microscope can be switched out or adjusted. After acquiring the images at high magnification, a macro image might be captured using a 10× objective lens, allowing for a comprehensive single-view capture of the slide. While this magnification may not provide the clarity necessary to discern specific regions of interest or detect abnormal patterns, it does effectively present the overall morphology of the unstained slide.

With continued reference to FIG. 1, the at least a marking device 112 is further configured to mark a region of interest on sample 116 as a function of an annotation mask 124. As used in this disclosure, an "annotation mask" is an annotation and/or marking created using a method or overlay technique used on the captured image and unstained samples. The annotation mask 124 may accentuate, shade, or emphasize distinct sections or areas, facilitating the clear marking or delineation of regions of interest, targeted zones, or significant points within the image. As a non-limiting example, masks might be manifested on slides, samples, and captured images as dashed lines, dotted lines, solid lines, or other delineation techniques. These masks may be generated either by projecting the mask directly onto the sample. For example, laser or LED technology may be utilized to case the mask onto the sample surface. Projecting mask onto the sample are speed and non-contact nature, it may reduce the risk of sample contamination. These masks may also be generated by programming mask data directly into the marking device. In the case of the latter, the marking device is equipped with either a built-in processor or a logic circuit. Processor or circuit may interpret the mask data, processor may receive the mask data and translate into a series of instructions. Instructions may be coordinates, directing the device to specific location, or they could be motion control commands, guiding the device's movement in real-time. For instance, mask may include a circular region of interest, processor may convert this into a set of coordinates defining the circle's perimeter and then guide the device to trace this exact shape on the sample. Once interpreted, the marking device may utilize this data to guide its operations, ensuring accurate representation and marking in line with the predefined mask. Moreover, feedback mechanisms may also be included. For instance, sensor may detect the device's position, ensuring it stays aligned with the mask's coordinates. If any discrepancies arise, real-time adjustments can be made. Marking device may also include optical device, or combination of optical devices, configured to capture field of vision as an electrical signal, to form a digital image. Optical device may include a single camera and/or two or more cameras used to capture field of vision; for instance, and without limitation, the two or more cameras may capture two or more perspectives for use in stereoscopic and/or three-dimensional display. Optical device may capture a feed including a plurality of frames, such as without limitation a video feed. In an embodiment, at least a marking device further includes a manipulator 128 configured to hold sample 116 with an end effector 132. The manipulator 128 may be guided by the mask, aligning a fixed stylus 136 with the regions of interest as indicated by the mask. The actual marking may then be carried out by the end effector 132, which responds to the mask's delineations to accurately target and mark the specified areas. As used in this disclosure, a "manipulator" a device or mechanism that can move or handle objects in a manner similar to a human arm. Manipulator 128 may encompass a range of designs and configurations, from simple single-joined device to more complex multi jointed system. For example, an "end effector" may be attached to one end of manipulator. As used in this disclosure, end effector 132 refers to a device designed to interact with the environment. In this case, end effector 132 may be grippers, tools, cameras, or other devices attached to manipulator. As a non-limiting example, in a laboratory setting, manipulator may be employed to transport a glass slides from one imaging station to another marking device. Manipulator 128 may be equipped with a multi jointed arm for precision, including end effector 132 designed as a soft-grip clamp. This clamp may ensure the individual slide is securely held and not damaged. Additionally, manipulator 128 might feature a small camera as another end effector 132, allowing technicians to monitor the slide's position and ensure its correct placement, without any manual intervention. Manipulator 128 may include any manipulator with end effector 132, including a rubber coating, textured surface, foam, adhesive tape or pad, vacuum or suction cup, magnetic gripper, or combinations thereof as described in U.S. patent application Ser. No. 18/382,386 filed on Oct. 20, 2023 and titled, "APPARATUS AND METHOD OF USE OF A MECHANISM THAT CONVERTS ROTARY MOTION INTO LINEAR MOTION" which is incorporated herein by reference in its entirety.

With continued reference to FIG. 1, the at least a marking device 112 further comprises fixed stylus 136. As used in this disclosure, "fixed stylus" refers to a device or apparatus designed to create mark or traces on a surface. The disclosure may refer "fixed" as a non-movable or stationary character within the system. In a non-limiting example, fixed stylus may be utilized in a laboratory setting to consistently mark specific points on glass slide. Due to its stationary nature, stylus may be able to precisely and repeatable marks each time, eliminating the variations that might arise from manually or frequently repositioned tools.

Still referring to FIG. 1, system 100 for a slide marking technique for target tissue extraction and downstream application includes the at least a computing device, wherein the computing device is configured to receive a stained slide image 140 and receive the image of the unstained surface of sample 116. As used in this disclosure, a "stained slide image" refers to a captured image data of sample 116. Once captured, the image data may be stored in a database or repository within the computing device. Such storage facilitates future references, comparisons, and processing. Moreover, the image data can be enhanced, annotated, or otherwise processed by the computing device to derive insights, map regions of interest, or guide subsequent robotic operations. In an embodiment, computing device is further configured to relate high magnification image to micro image. As a non-limiting example, in a medical research environment, a researcher might first capture high magnification image of a region of interest in stained slide to inspect cellular details of a tumor. A detailed view may then be juxtaposed with macro image of the entire slide to provide context and overall morphology. Computing device may map the position and boundaries of the highly magnified region within the overall macro image, facilitating a holistic view.

In another embodiment, still referring to FIG. 1, relating high magnification image to macro image further comprises locating at least a fiducial 144 on a calibration slide 148 using high magnification and macro magnification. As used in this disclosure, a "fiducial" refers to an object placed in the field of view of an imaging system that appears in the image produced, for use as a point of reference or a measure. The fiducial 144 may be either something placed into or on the imaging subject, or a mark or set of marks in the reticle of an optical instrument. For example, in high-resolution optical microscopy, fiducials may be used to actively stabilize the field of view by compensating for unintended stage drift or vibrations. Fiducials may be tiny markers or features, tracked in real-time by system. If any drift or shift is detected from the reference position of these fiducials, immediate corrective adjustments are made to the microscope's stage or optics. This may ensure that the region of interest remains consistently centered and in focus during imaging sessions, for example, during prolonged observations or when capturing a series of images for time-lapse studies. As used in this disclosure, a "calibration slide" is a slide used in microscopic imaging that may accurately transfer and alignment of annotations, particularly regions of interest, from one imaging scale or modality to another. The calibration slide 148 may serve as an anchor mechanism, enabling the precise alignment of high magnification images and its region of interest. For example, to extract DNA from specific tumor regions in unstained slides, the calibration slide may facilitate two main calibrations: firstly, the mapping of 40× annotations from an H&E slide to its encompassing macro image; and secondly, the transfer of annotation mask, which in this case, may be a tumor mask, coordinates from unstained macro images to robot coordinates. As a non-limiting example, consider a clinical setting where a pathologist identifies abnormal cells on an H&E stained slide under 40× magnification. Utilizing the calibration slide procedure, which may involve optical recognition algorithms or machine learning models, these cell annotations may be mapped and transferred onto a macro image of the slide. The calibrate macro image may serve as a reference. It may be placed side by side with its unstained counterpart. Advanced image processing techniques, such as edge detection and pattern recognition, may then be employed to align these two images perfectly. Upon alignment, a computing system include the calibrated coordinates, equipped with robotic arms or manipulators, it can target and precisely mark the identified tumor regions on the unstained slide. The calibrated coordinates may then target and mark the identified tumor regions on the unstained slide, ensuring that DNA extraction occurs accurately from the exact regions of interest, thereby maximizing the DNA's purity.

With continued reference to FIG. 1, in an embodiment, wherein the calibration further includes employing manipulator 128 equipped with fixed stylus 136 to mark region of interest on calibration slide 148 in a geometric registration 152. As used in this disclosure, a "geometric registration" refers to a process of aligning two or more images of the same scene. As a non-limiting example, a laboratory setup where a calibration slide showcasing tissue samples from a patient is positioned under an optical microscope. The tissue sample on this slide has already been imaged, and regions of interest, such as suspected tumor areas, have been identified on a digital interface. In order to translate these digital identifications into tangible markings for further analysis, manipulator 128 equipped with fixed stylus 136 may be employed. Guided by the geometric registration 152, described further below, from the digital identifications, manipulator 128 may position fixed stylus 136 over the exact locations on calibration slide 148 that correspond to regions of interest. Once in position, fixed stylus 136 may mark these regions on the physical slide. The marked calibration slide 148 can then be used as a reference for other analyses to ensure all subsequent procedures are consistently focused on the exact regions of interest initially identified. In another embodiment, the calibration further comprises relocating the marked calibration slide 148 using manipulator 128 to macro imaging location within annotation mask 124. As a non-limiting example, calibration slide may be marked to highlight regions of interest, denoting areas of abnormal cell growth. Once marked, macro image may be captured and the sample may be able to discern the marked regions. Manipulator 128 may be programmed to pick up the marked calibration slide. Manipulator 128 may relocate the slide to a specified macro imaging location within the instrument. This location may be optimized for macro imaging and is properly aligned with the annotation mask's parameters. Once positioned, the instrument may capture macro image of the entire slide, ensuring that the marked regions of interest are clearly visible and aligned with the previously established annotation mask. In a further embodiment, wherein the calibration further comprise identifying the geometry registration on annotation mask 124 calibration slide via macro imaging. Geometry identified refers to "known geometry," as used herein refers to a pre-defined set of shapes, patterns, or configurations that are standardized and consistent across different calibration processes. This geometry is stored in the system's memory and is utilized as a reference during calibration. System may recognize and aligns with this geometry to ensure precise and consistent marking on the calibration slide in robot coordinates. As a non-limiting example, a medical research facility may be working on identifying novel cell patterns within diseased tissues. For calibration, facility may use an annotation mask calibration slide, which has specific geometric patterns known to the researchers. These patterns may serve as reference points, ensuring consistent imaging across various samples. Upon placing calibration slide under the microscope, the macro imaging technique may be employed. As the whole slide comes into view, geometric registration 152 marked on calibration slide 148 may then become evident. These patterns might include specific shapes, lines, or dots arranged in a particular order or configuration. In an embodiment, wherein the calibration further comprises determining annotation mask function based on the region of interest of the geometry in both the robotic marking and macro image coordinates, thereby correlating macro image coordinates to robotic marking. As a non-limiting example, a pathology laboratory may be dealing with large volumes of tissue samples daily. These samples often have regions of interest that are critical to diagnose diseases accurately, such as cancerous growths. A lab may use a high-tech system that combines robotic marking with macro imaging. Before starting the actual sample processing, calibration slide may be used to calibrate the system, which may have a pre-defined geometric registration of region of interest. This pattern and coordinates may be marked using the robotic masking, for example, R-coordinates may be stored. Subsequently, the same calibration slide may be imaged using macro imaging system. Which determines the coordinates of the marked pattern in the macro image, for example, M-coordinates. With both R-coordinates and M-coordinates known, system may be trained to understand the relationship between them. For instance, if a region is marked at point $(x1, y1)$ in the robotic marking, the function would determine where this region appears in the macro image, at point $(x2, y2)$.

With continued reference to FIG. 1, relating the high magnification image to the macro image further includes computing a mapping function from high magnification to macro magnification using the location of the at least fiducial 144 at the high magnification and at the macro magnification. As used in this disclosure, a "mapping function" is an algorithm, formula, or mathematical function that establishes a relationship between two sets of data points or coordinates. Mapping function may be represented as a formula, mathematical function, or other methodologies and may be stored as a data structure that encapsulates such mapping. In this disclosure, the mapping function determines the correlation between positions or features observed in high magnification image and corresponding locations in a macro image. This function allows for the translation, rotation, scaling, or transformation of points from one magnification level to another, ensuring that regions of interest are accurately represented and aligned across different magnifications. As a non-limiting example, a tumor cell cluster may be identified under high magnification that occupies a certain position relative to a fiducial marker. Using the mapping function, this specific region may be pinpointed on macro image, even though the tumor cell cluster might appear much smaller or less distinct at lower magnification. By relying on the fiducial's known locations in both magnifications, mapping function may provide accurate coordinates for the tumor cluster in macro image, ensuring consistent and precise annotations across different imaging scales.

Still referring to FIG. 1, a position of a camera relative an object (i.e., pose of the camera) can be estimated. In some cases, pose estimation may require knowledge of calibration parameters of camera, specifically a camera matrix, K, and distortion coefficients. Calibration parameters may be specific to camera and may be unchanging, until the camera optics are modified, for example with a change in focus. An example intrinsic camera matrix, K, is shown below:

$$K = \begin{pmatrix} \alpha & s & x_0 \\ 0 & \alpha & y_0 \\ 0 & 0 & 1 \end{pmatrix}$$

where a is the focal length of camera in terms of pixel dimensions, and $(x_0, y_0)$ is a principle point on image, e.g. a point along the camera's z-axis, and s is a skew factor which is often zero for ell-corrected optics. Camera pose respect to an object can be found from a transformation from an object coordinate system to a camera coordinate system, such as a homography transform, a perspective n-point transform, and/or an affine transform. Transformation can be described as:

$$sp_c = K[R|T]p_w$$

where s is a scale factor, $p_w = [x\ y\ z\ 1]^T$ is a homogeneous world point, $p_c = [u\ v\ 1]^T$ is a corresponding homogeneous image point, K, is intrinsic camera matrix, and R and T are desired 3D rotation and 3D translation of the camera. According to some embodiments, transformation comprises a Perspective-n-Point (PnP) solution, such as solvePnPRansac method, which can be found in OpenCV's Camera Calibration and 3D Reconstruction module. solvePnPRansac further comprises RANSAC in conjunction with PnP solutions and makes the estimated pose more robust to outliers.

With continued reference to FIG. 1, computing device is configured to determine geometric registration 152 of the unstained surface of sample 116 to the stained slide image 140, wherein determining geometric registration 152 comprises identifying region of interest from stain slide image corresponding to the at least a targeted cell type 156. As described in this disclosure, a "targeted cell type" refers to a specific category or classification of cells that have been pre-determined as being of particular interest or significance for the purpose of the study or analysis. This could be based on their unique morphological features, functional attributes, pathological indications, or any other distinctive characteristics that separate them from surrounding cells or tissues. In a non-limiting example, a researcher may be studying a particular form of cancer, the targeted cell type might refer to the specific cancerous cells present within a tissue sample. When stained slide image 140 is examined, geometric registration 152 process would prioritize and identify these cancerous cells, distinguishing them from healthy surrounding cells based on their unique staining patterns, morphological changes, or other discernible features. In an embodiment, identifying region of interest from stained slide image 140 corresponding to a targeted cell type 156. In a non-limiting example, stained slide image may originate from a biopsy of lung tissue suspected of lung carcinoma, region of interest may be areas within the slide where the cells show distinctive staining patterns characteristic of cancerous cells. Using stained slide as a guide, system may zoom into and identify clusters of irregularly-shaped cells with darker staining nuclei, indicating the presence of the targeted lung carcinoma cells. This identified region then becomes the focus for further analysis or extraction procedures.

With continued reference to FIG. 1, determining geometric registration 152 includes aligning stained slide image 140 with the image of the unstained surface. In a non-limiting example, a biopsy taken from liver tissue where a potential presence of fibrosis may be investigated. The stained slide image, after undergoing a staining procedure, reveals distinct patterns that highlight fibrotic regions in blue. On the other hand, the unstained surface image of the liver tissue displays a clear, translucent representation without these highlighted regions. Determining geometric registration 152 may involve overlaying these two images, ensuring that the tissue structures, such as blood vessels and ducts, match up perfectly. Once aligned, the blue-highlighted regions on the stained image can guide researchers or medical professionals to the precise areas of interest on the unstained sample.

With continued reference to FIG. 1, in some embodiment, determining geometric registration 152 further includes locating targeted cell type 156 within the image of the unstained surface, as a function of stained slide image 140. In a non-limiting example, sample from a breast biopsy may be investigated for potential malignancies. Stained slide image 140, after undergoing specific staining processes, might show clusters of cells with irregular shapes and sizes, indicating potential cancerous cells. This can be classified as targeted cell type 156. When looking at the unstained surface image, these clusters may not be as evident. However, by determining the geometric registration, correlation between the structures seen in stained slide image 140 and the topography in the unstained image may be established. This correlation may be facilitated by advanced computational algorithms and imaging software. Tools may analyze and match the distinctive features and patterns from both images. Such a systematic alignment ensures that even subtle morphological changes or unique structures in the stained image can be accurately located on the unstained surface.

With continued reference to FIG. 1, in some embodiment, determining geometric registration 152 further includes determining annotation mask 124, as a function of the location of targeted cell type 156 within the image of the unstained surface. A medical lab may be analyzing two microscopic slides of a patient's tissue sample. The first slide shows a stained tissue sample where tumor cells have been highlighted with a special dye. The second slide is of an unstained tissue sample taken from a similar region of the patient's body. System 100 may take stained slide image 140 and pinpoint the tumor cells' location based on their distinct coloration or morphology. Geometric registration 152 may be used to process, it may then align the stained image with the image of the unstained sample. System then identifies the regions corresponding to the tumor cells based on their morphology and other subtle visual cues. Annotation mask 124 may be generated to assist future analysis. Annotation mask 124 may overlay the unstained image and highlights the areas where the tumor cells are located, by drawing a circle or shaded region around region of interest. By doing so, a pathologist may easily focus on the specific regions in the unstained slide, ensuring they examine the most critical parts of the sample. As a non-limiting example, consider the process of transferring a delineated tumor mask from an H&E slide to its corresponding unstained slide may be a step before extracting DNA from the tumor area. Due to the slide preparation of serial sections, the tissue's location and orientation can vary between slides. To ensure accuracy in mask transfer, registration algorithms may be employed to determine the translation and rotation between the H&E serial section and the unstained serial section. Without precision, the extracted sample might contain DNA from both the tumor and normal tissue, leading to an impure and undesirable mixture.

In a further embodiment, still referring to FIG. 1, system 100 includes a tissue section device configured to extract the marked region of interest from the tissue paraffin block. The tissue of interest, potentially from a biopsy sample suspected of containing tumor cells or other cells of interest, may initially embed into a block, often paraffin but not limited to it. Embedded tissue may then be sectioned into thin slices and subsequently mounted onto slides. After the region of interest has been identified on the sectioned slides, the location of this region can be precisely mapped back to its original position on the tissue block. Given that the exact depth and orientation of each sectioned slice are known, a 3D coordinate system can be constructed that pinpoints the exact location of the marked region within the block itself. Mapped coordinates may be used, system 100, with integrated marking capabilities, may then inscribe or indicate region of interest directly on the surface of the tissue block. This marking may serve as a guide for subsequent extractions or further sectioning. Precise location data may be armed on the tissue block, tissue section device may accurately extract the identified region of interest from the tissue block. This ensures that only the targeted tissue area, such as a particular growth or cell cluster, may be processed further, eliminating superfluous or non-relevant tissue sections. As a non-limiting example, a pathology lab may be processing a biopsy sample suspected of containing tumor cells. Once the tissue is embedded in a paraffin block or other block as described above, it may be typically sectioned into thin slices and mounted on slides for staining and examination. System may be equipped with a tissue section device, can identify and extract a specific region of interest, previously marked as potentially harboring tumor cells, directly from the tissue paraffin block. This extraction may ensure that only the desired tissue area, such as a suspicious-looking growth, is further processed and examined. Harvesting specific cell types from a tissue for sequencing (DNA, RNA, microRNA etc.) can be made even more optimal by directly harvesting specific cell types from tissue embedded in a paraffin block before slices are made.

In another embodiment, system further configured to harvest targeted cell type 156 from sample 116 which includes tissue paraffin block or other types of blocks for slide preparation. As a non-limiting example, consider a patient's tissue sample may be embedded in a paraffin block, and multiple slides may be prepared from this block for diagnostic purposes. Traditionally, a technician might stain one slide to identify tumor cells and then attempt to locate these same cells on subsequent unstained slides by painstakingly aligning each slide to the stained reference. Manual alignment process can be time-consuming and errors, especially if the alignment is slightly off or if the tissue orientation differs slightly between slides. With system 100, instead of individually aligning each unstained slide, the entire tissue paraffin block from which the slides were derived can be registered or aligned just once, using the reference from stained slide. This approach may ensure that the exact region containing targeted cell type 156, such as tumor cells, is consistently and accurately harvested from every slide derived from the block.

Figure 2:
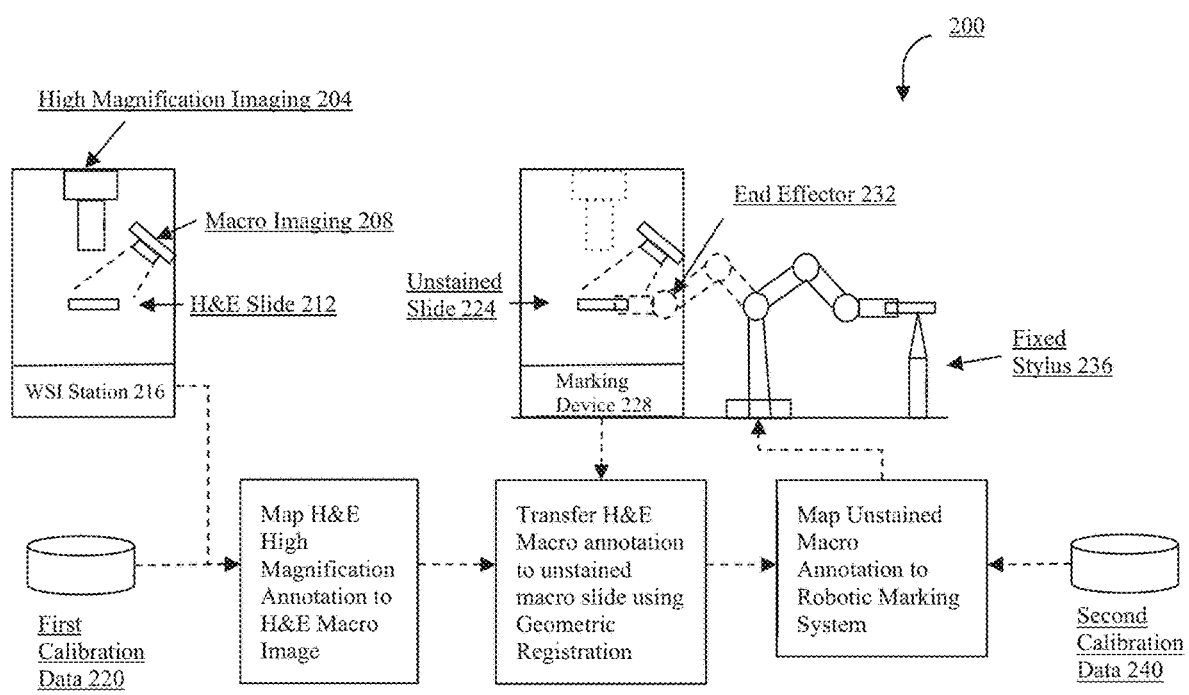
FIG. 2 illustrates a system diagram with transfer and mark of annotation components.

Referring now to FIG. 2, an exemplary embodiment of a system diagram with transfer and mark of annotation components is illustrated. System diagram 200 illustrates transfer annotations from an H&E high magnification image 204 onto its counterpart unstained slide 224, both slides originate as serial sections from an identical tissue block.

With continued reference to FIG. 2, system diagram 200 includes an imaging process, the H&E slide 212 may undergo a two-tiered imaging process. First, with macro imaging 208, broader, foundational layer of imaging, capturing the overarching layout and structure of the tissue. Second, the high magnification imaging 204, detailed, 40× magnification, annotations at this magnification can be sourced through advanced analytic algorithms or manual techniques, depending on the requirements. Conversely, the unstained slide 224 is imaged solely at the macro level, streamlining the process and focusing on broader tissue structures.

With continued reference to FIG. 2, system diagram includes a transferring annotations obtained using two calibration process. First calibration 220 involves mapping high magnification to a macro image 208. This step may utilize the data to spatially correlate locations from the high magnification images to their respective positions on the macro images 208. By establishing this mapping relationship, it may ensure that any annotations made at a granular level (high magnification) can be translated accurately onto the broader layout (macro image) of the H&E slide. Second calibration 240 may involve mapping micro to robotic marking system. Post the first calibration 220, the macro images 208 may undergo another transformation process. Leveraging the second calibration 240, locations from macro images 208 may be systematically mapped onto the robotic marking system, ensuring the robotic components, such as the end effector 232 and the fixed stylus 236, may accurately mark the desired annotations on the unstained slide 224.

With continued reference to FIG. 2, system diagram 200 includes annotation transfer process. Using the dual calibration data and the registered image, the annotation from the H&E high magnification image 204 can be accurately mapped to its corresponding location on the unstained slide 224. Calibrated data may provide a transformation matrix or set of reference points which connects the two slides. The process entails precise marking on the flat surface of a glass slide. Utilizing geometric registration algorithms, the system may establish the exact spatial correspondence between the stained H&E slide 212 and its unstained counterpart. A square may then be drawn around the region of interest to delineate the target area. Delineated area may be imaged under macro magnification, serving as a known input to the system. The next step involves adjusting the corners of the captured image using a perspective n-point transformation algorithm, which may refine the orientation and scaling of the region of interest. This adjustment is critical to generate an accurate transformation matrix, ensuring that the region of interest on the unstained slide 224 is correctly aligned for further downstream applications, such as detailed analysis or precise extraction. The process also includes deploying the robotic marking system, informed by the second calibration data 240, to physically annotate the unstained slide 224 at the requisite locations.

Figure 3:
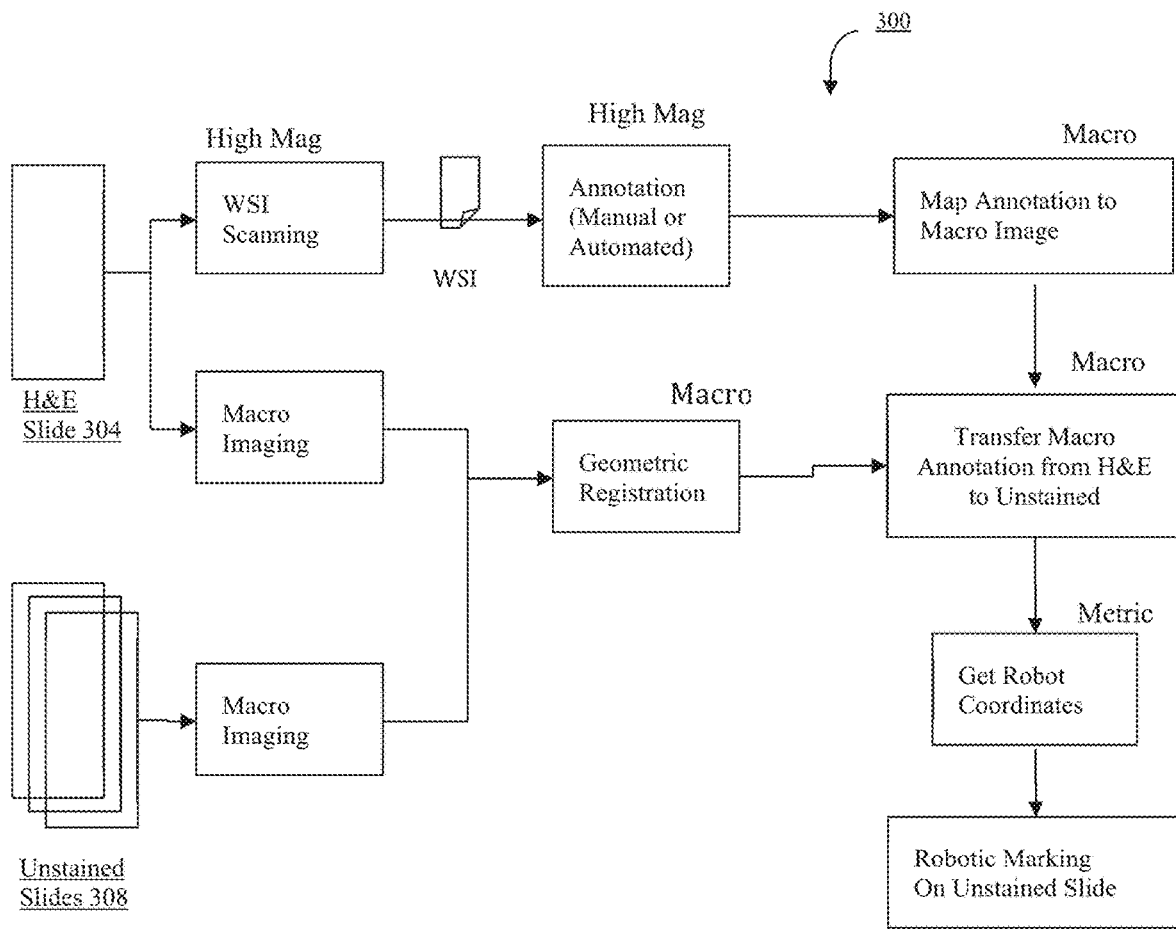
FIG. 3 is a flow diagram illustrating an exemplary workflow of computation involved in marking annotation for robotic marking.

Referring now to FIG. 3, a flow diagram of an exemplary work flow of computation involved in marking annotation for robotic marking is illustrated. Image process may be initiated with a H&E slide 304 undergoing two imaging stages. First, the slide may be subjected to whole slide imaging (WSI) scanning, the scanning results in high magnification (high mag). Second, the slide may undergo a broad scare imaging to capture the overall layout of sample. An unstained slide 308 may be imaged at the micro scale.

Still referring to FIG. 3, post WSI scanning, the high magnification image may undergo an annotation process. This may be done manually, where a pathologist or expert identifies and marks specific regions of interest on the tissue. This may also be done automated, where computational algorithms detect and annotate specific features or abnormalities on the tissue.

With continued reference to FIG. 3, annotations from the high magnification image may be mapped onto corresponding macro image. The macro image of the H&E slide 304 may be then aligned with the macro image of the unstained slides 308 using geometric registration. This process may determine the spatial correspondence between both slides, ensuring annotations are accurately transferred to the correct locations on the unstained slide 308.

With continued reference to FIG. 3, get robot coordinates, may be informed by a second set of calibration data. The calibration may ensure the robotic precision and accuracy in marking. Last, the robotic marking utilizes the translated coordinates to physically annotate the unstained slide at the requisite locations.

Figure 4:
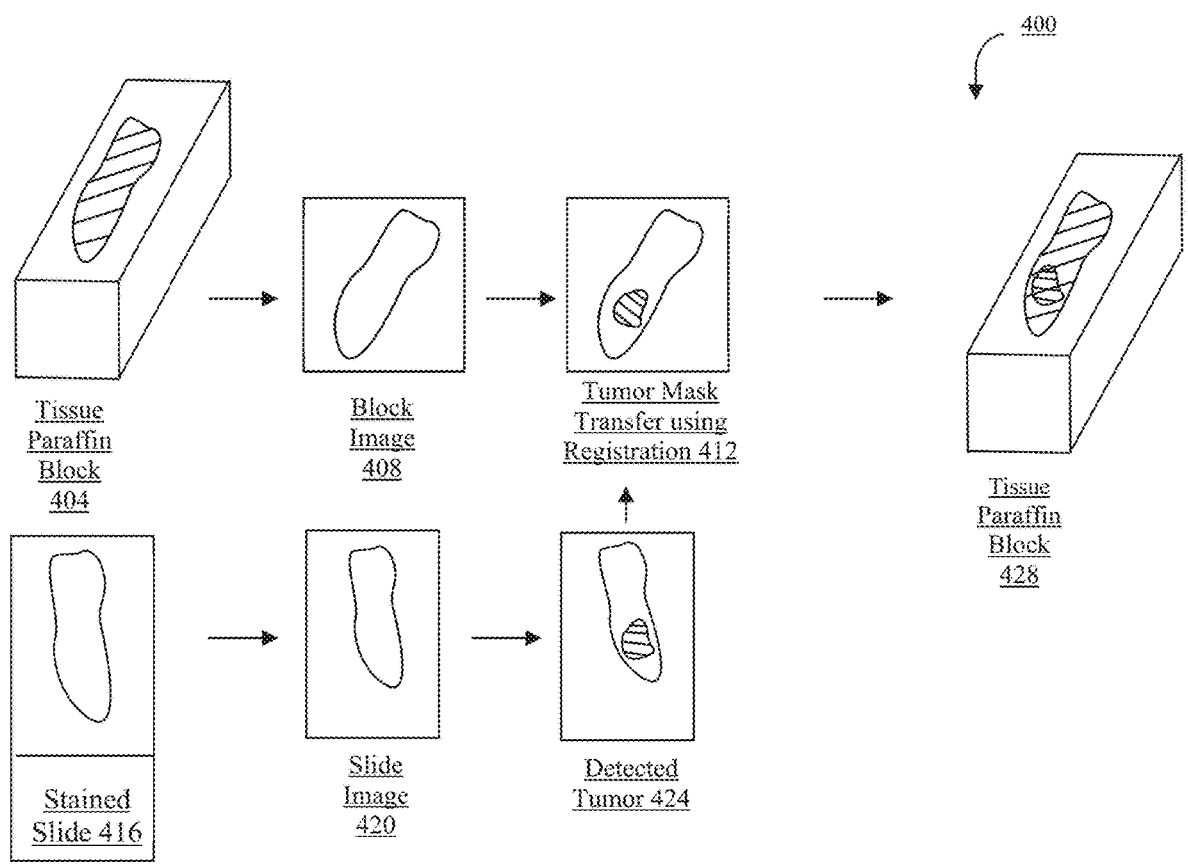
FIG. 4 is a flow diagram illustrating an exemplary workflow in one embodiment of detection of tumor.

Referring now to FIG. 4, a flow diagram of an exemplary workflow of detection of tumor on a stained slide is illustrated. The tissue paraffin block 404 has a block of tissue embedded in paraffin, typically used for histological examination. The paraffin-embedded block contains the tissue specimen, which will be examined for the presence of tumors. Block image 408 refers to a high magnification image of the tissue block. The stained slide 416 represents the thin sections of the tissue that may be cut from the paraffin block and stained. Slides may be stained to highlight different cellular structures and features, facilitating the identification of tumors. Slide image 420 may be acquired to provide detailed visual reference of the tissue after staining. After reviewing the Slide image 420, region of interest may be identified. Those regions may be marked and referred to as a detected tumor 424 pinpoints the exact location of the tumor on the stained slide 416. The tumor mask transfer using registration 412 process involves aligning and superimposing the detected tumor's coordinates from the slide image 420 back onto the original block image 408. This may ensure that the exact location and dimensions of the tumor may be mapped back onto the original tissue block, provide a comprehensive view of tumor location is situated in the larger tissue context. Last, the tissue paraffin block 428 presents the tumor location on the original tissue block.

Figure 5:
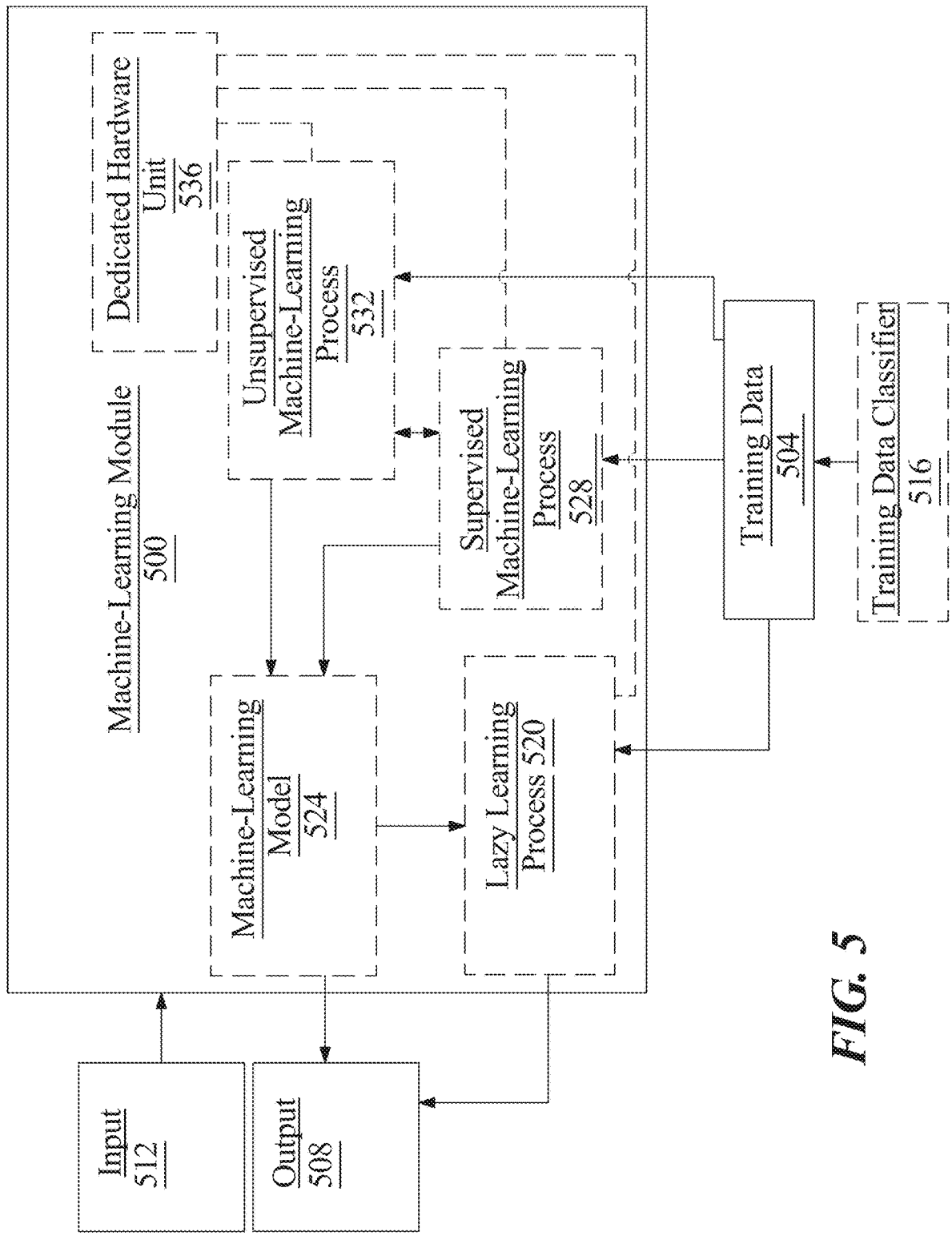
FIG. 5 is a block diagram of an exemplary machine-learning process.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example, high magnification image of tissue sample, either stained or unstained may be an input for training data. Outputs location points, pixel points, area mapping in region of interest in the image where tumor may be represented as bounding boxes or masks over the tumor area.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, the training data classifier 516 may classify elements of the training data based on the fact that different tissues have varying cellular structures and appearances. By filtering the training data according to tissue types, such as epithelial, connective, or muscular, we can achieve more accurate results. Tailoring the training data to specific conditions or subjects allows the model to recognize patterns with greater effectiveness, leading to fewer false positives or negatives when generating geometric registration.

Still referring to FIG. 5, computing device 504 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 504 may then calculate a likelihood table by calculating probabilities of different data entries and classification labels. Computing device 504 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 5, computing device 504 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 5, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\Sigma_{i=0}^{n}a_i^2$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 5, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitation may include utilizing algorithms for identifying duplicate entries or spell-check algorithms.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 5, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 5, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 5, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory 108; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input as described in this disclosure as inputs, output as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
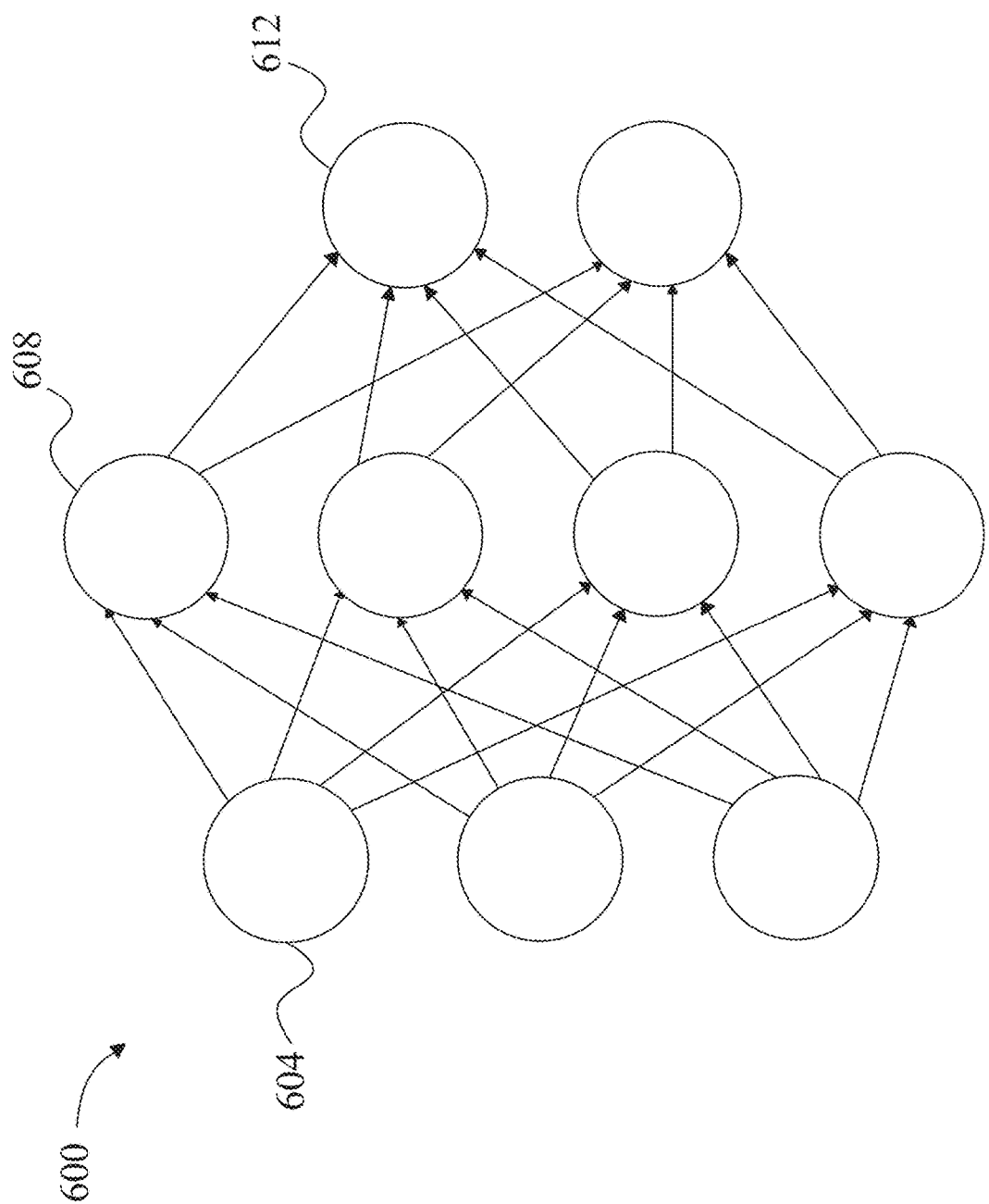
FIG. 6 is a diagram of an exemplary embodiment of neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
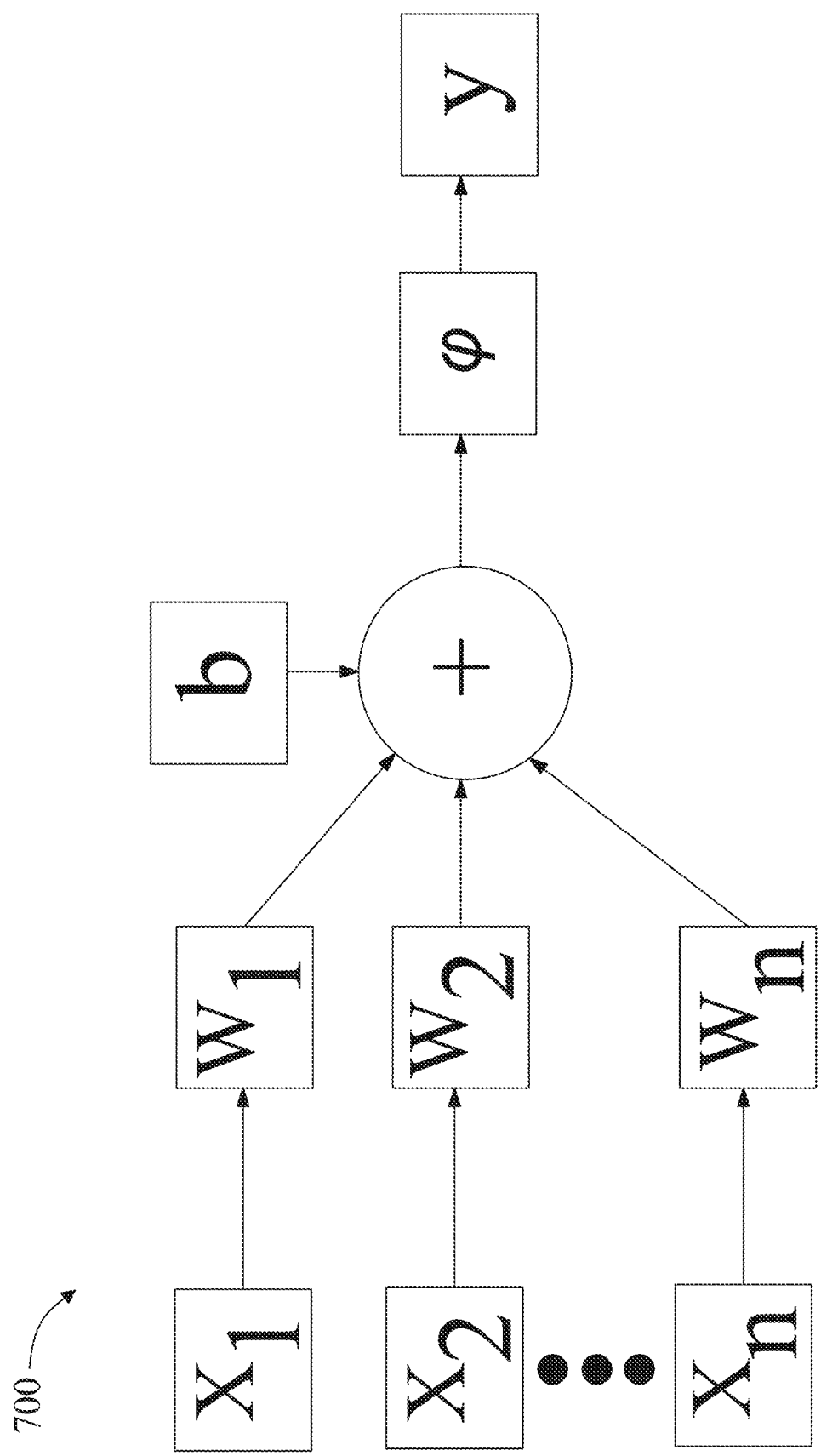
FIG. 7 is a diagram of an exemplary embodiment of a node of a neural network.

Referring now to FIG. 7, an exemplary embodiment of a node 700 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as ƒ(x)=tanh²(x), a rectified linear unit function such as ƒ(x)=max (0, x), a "leaky" and/or "parametric" rectified linear unit function such as ƒ(x)=max (ax, x) for some a, an exponential linear units function such as $$f(x) = \begin{cases} x & \text{for } x \geq 0 \\ \alpha(e^x - 1) & \text{for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as ƒ(x)=x*sigmoid(x), a Gaussian error linear unit function such as ƒ(x)=a(1+tanh ($\sqrt{2/\pi}$(x+bx$^r$))) for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
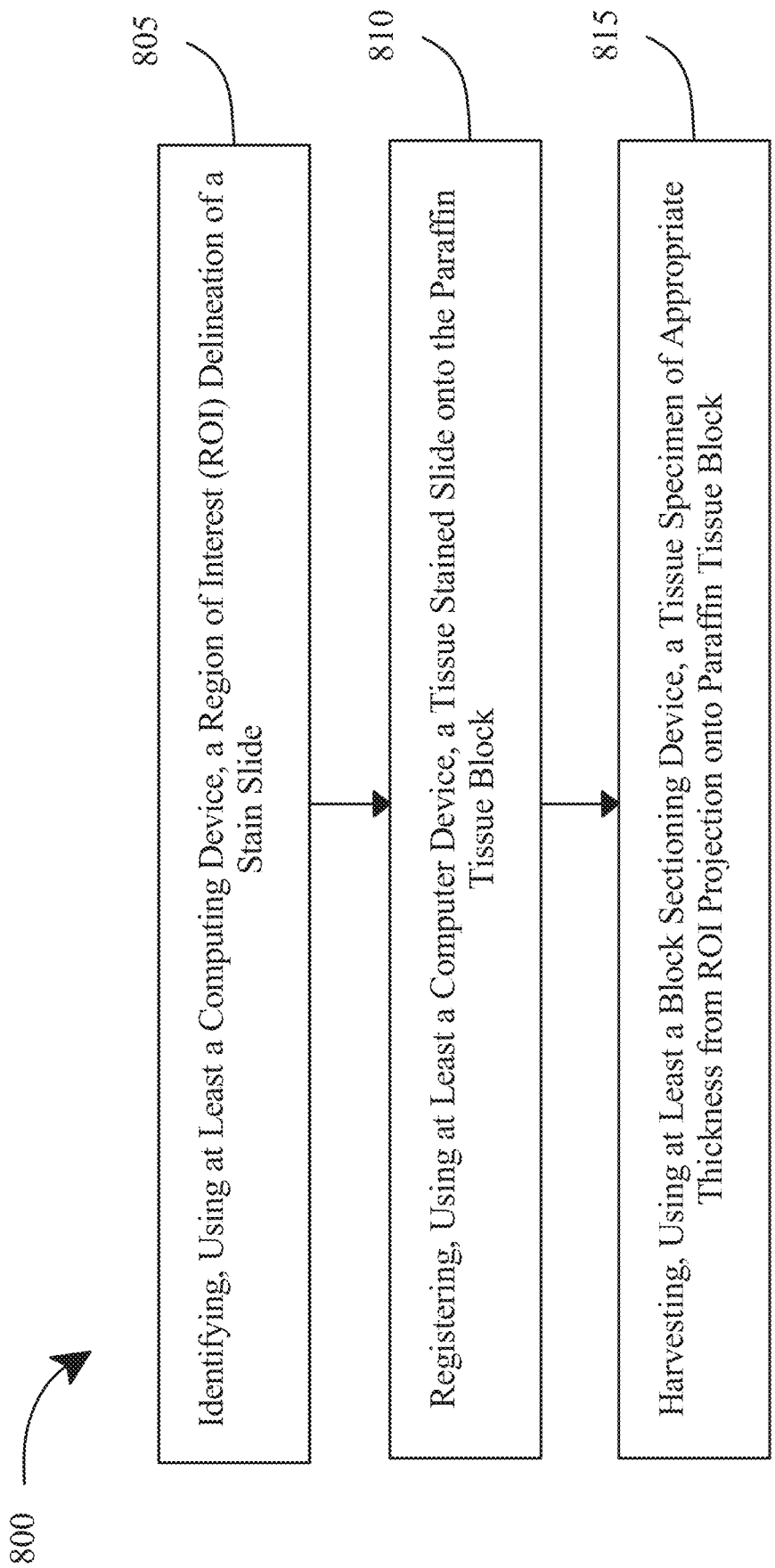
FIG. 8 is a flow diagram illustrating an exemplary workflow of a method for harvesting specimens.

Referring now to FIG. 8, a flow diagram of an exemplary method 800 for harvesting specimens is illustrated. Method 800 includes step 805 of identifying, using at least a computing device, a region of interest (ROI) delineation of a stain slide. This may be implemented, without limitation, as described above with reference to FIGS. 1-7.

With continued reference to FIG. 8, method 800 includes a step 810 of registering, using at least a computer device, a tissue stained slide onto the paraffin tissue block. This may be implemented, without limitation, as described above with reference to FIGS. 1-7.

With continued reference to FIG. 8, method 800 includes a step 815 of harvesting, using at least a block sectioning device, a tissue specimen of appropriate thickness from ROI projection onto paraffin tissue block. This may be implemented, without limitation, as described above with reference to FIGS. 1-7.

Figure 9:
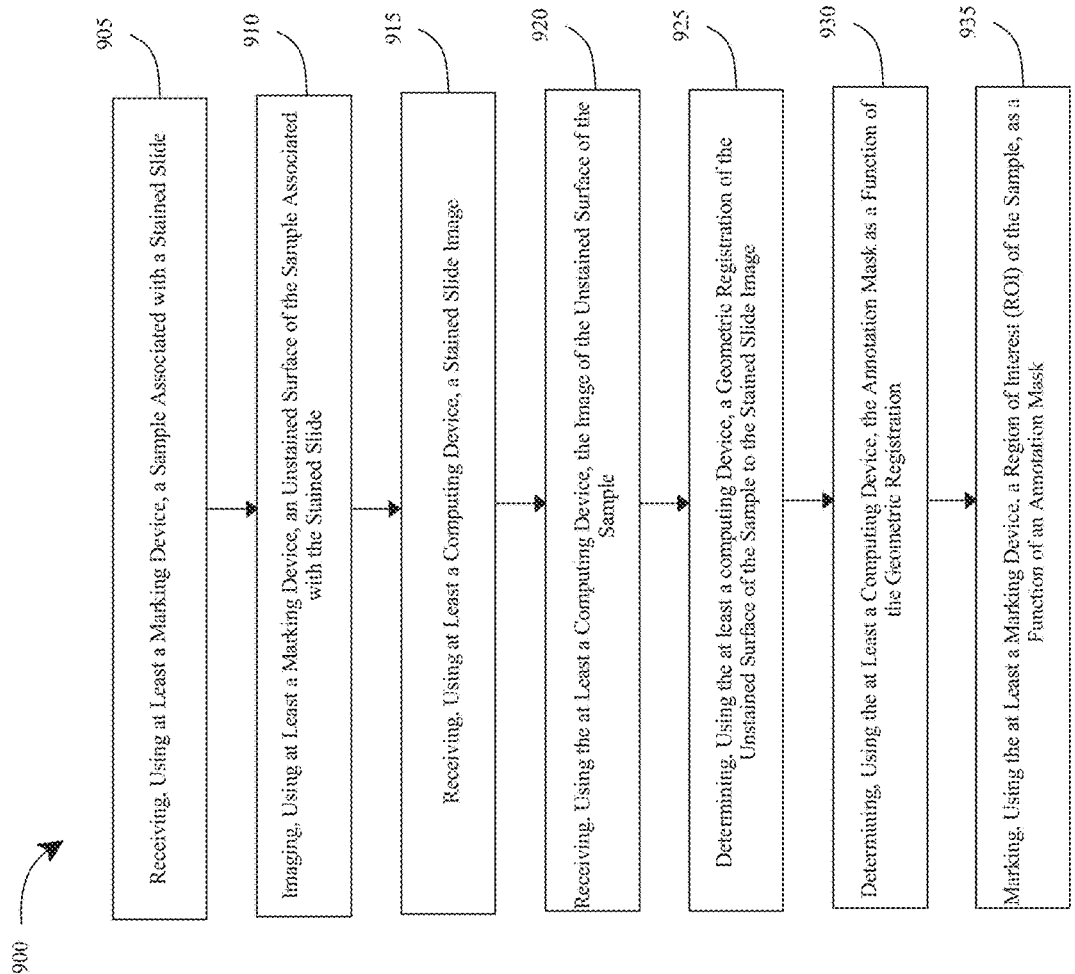
FIG. 9 is a flow diagram illustrating an exemplary workflow of a method for a slide marking technique for target tissue extraction and downstream application.

Referring now to FIG. 9, a flow diagram of an exemplary method 900 for a slide marking technique for target tissue extraction and downstream application is illustrated. Method 900 includes step 905 of receiving, using at least a marking device, a sample associated with a stained slide. This may be implemented, without limitation, as described above with reference to FIGS. 1-8.

With continued reference to FIG. 9, method 900 includes a step 910 of imaging, using the at least a marking device, an unstained surface of the sample associated with the stained slide. This may be implemented, without limitation, as described above with reference to FIGS. 1-8.

With continued reference to FIG. 9, method 900 includes a step 915 of receiving, using at least a computing device, a stained slide image. This may be implemented, without limitation, as described above with reference to FIGS. 1-8.

With continued reference to FIG. 9, method 900 includes a step 920 of receiving, using the at least a computing device, the image of the unstained surface of the sample. This may be implemented, without limitation, as described above with reference to FIGS. 1-8.

With continued reference to FIG. 9, method 900 includes a step 925 of determining, using the at least a computing device, a geometric registration of the unstained surface of the sample to the stained slide image. This may be implemented, without limitation, as described above with reference to FIGS. 1-8.

With continued reference to FIG. 9, method 900 includes a step 930 of determining, using the at least a computing device, the annotation mask as a function of the geometric registration. This may be implemented, without limitation, as described above with reference to FIGS. 1-8.

With continued reference to FIG. 9, method 900 includes a step 935 of marking, using the at least a marking device, a region of interest of the sample, as a function of an annotation mask. This may be implemented, without limitation, as described above with reference to FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
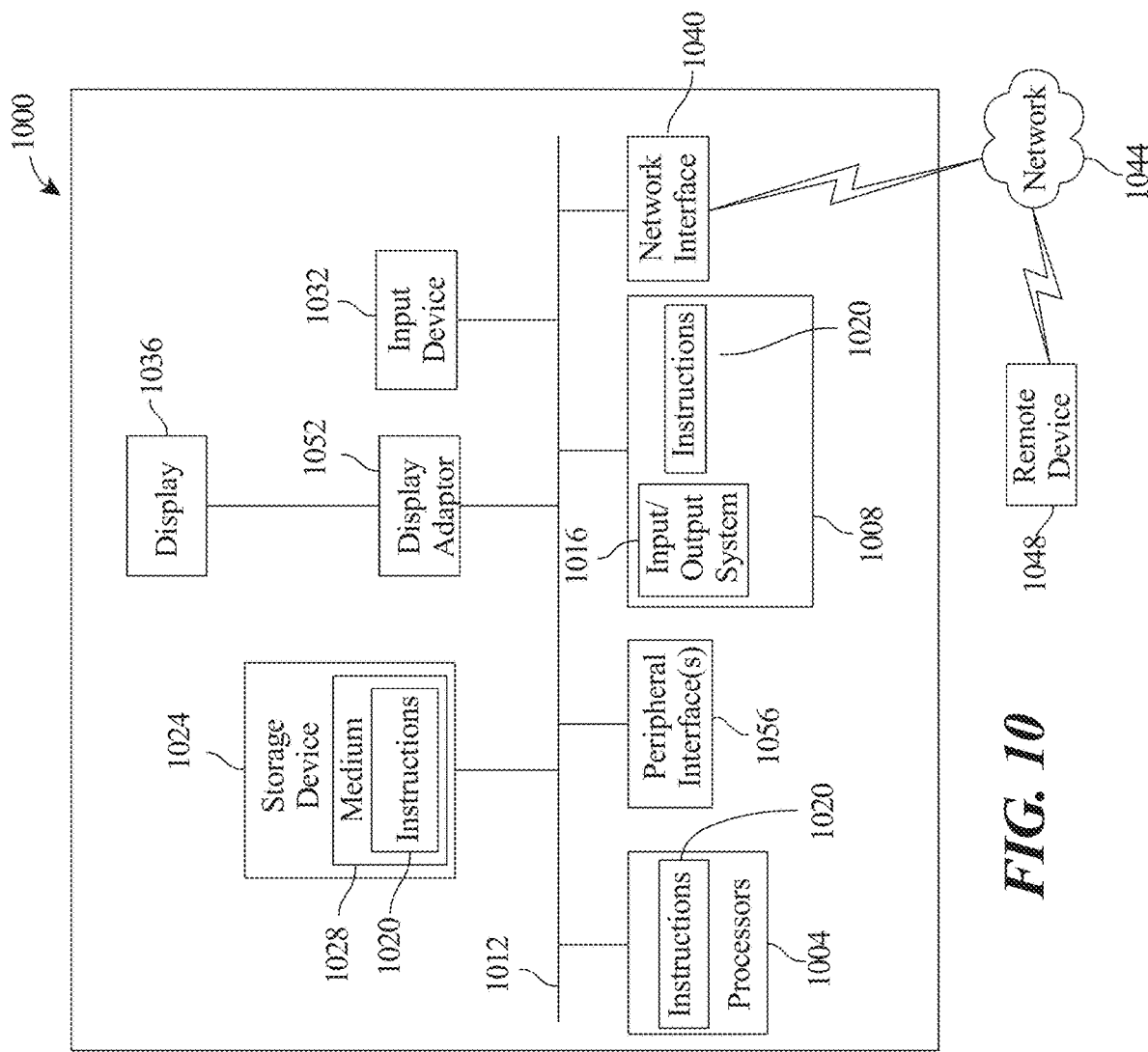
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for a slide marking technique for target tissue extraction and downstream application, the system comprising:
   at least a marking device, wherein the at least a marking device is configured to:
   receive a sample associated with a stained slide;
   image an unstained surface of the sample associated with the stained slide; and
   mark a region of interest on the sample, as a function of an annotation mask;
   at least a computing device comprising at least a processor and a memory, the computing device configured to:
   receive a stained slide image;
   receive the image of the unstained surface of the sample;
   determine a geometric registration of the unstained surface of the sample to the stained slide image, wherein determining the geometric registration comprises:
   aligning the stained slide image with the image of the unstained surface;
   determine the annotation mask as a function of the geometric registration; and
   provide the annotation mask to the marking device.

2. The system of claim 1, wherein the at least a marking device further comprises a manipulator configured to hold the sample with an end effector.

3. The system of claim 1, wherein imaging the unstained surface comprises capturing a macro image.

4. The system of claim 1, wherein the at least a marking device further comprises a fixed stylus.

5. The system of claim 3, wherein the at least computing device is further configured to relate the high magnification image to the macro image.

6. The system of claim 5, wherein relating the high magnification image to the macro image further comprises:
   locating at least a fiducial on a calibration slide using high magnification;
   locating the at least a fiducial on the calibration slide using macro magnification; and
   computing a mapping function from high magnification to macro magnification using the location of the at least a fiducial at the high magnification and at the macro magnification.

7. The system of claim 6, wherein the macro to robotic coordinates calibration further comprises:
   employing the manipulator equipped with a pen to mark a known geometry on a calibration slide in the robot coordinates;
   relocating the marked calibration slide using the manipulator to a macro imaging location within the marking station;
   identifying the known geometry on the marked calibration slide via macro imaging; and
   determining the mapping function based on the location of the geometry in both the robot and macro image coordinates, thereby correlating macro image coordinates to robot coordinates.

8. The system of claim 1, wherein the determining the geometric registration comprises:
   identifying a target area from the stained slide image corresponding to the at least a targeted cell type;
   locating the at least a targeted cell type within the image of the unstained surface, as a function of the stained slide image; and
   determining the annotation mask, as a function of the location of the at least a targeted cell type within the image of the unstained surface.

9. The system of claim 1, wherein the system is further configured to harvest at least a targeted cell type from the sample which comprises a tissue paraffin block.

10. The system of claim 9, further comprises a tissue section device configured to extract the marked region of interest from the tissue paraffin block.

11. A method for a slide marking technique for target tissue extraction and downstream application, the method comprising:
   receiving, using at least a marking device, a sample associated with a stained slide;
   imaging, using the at least a marking device, an unstained surface of the sample associated with the stained slide;
   receiving, using at least a computing device, a stained slide image;
   receiving, using the at least a computing device, the image of the unstained surface of the sample;
   determining, using the at least a computing device, a geometric registration of the unstained surface of the sample to the stained slide image, wherein determining the geometric registration comprises:
      aligning the stained slide image with the image of the unstained surface;
   determining, using the at least a computing device, the annotation mask as a function of the geometric registration;
   providing, using the at least a computing device, the annotation mask to the marking device; and
   marking, using the at least a marking device, a region of interest of the sample, as a function of an annotation mask.

12. The method of claim 11, further comprising holding, using the at least a marking device comprising a manipulator with an end effector, the sample.

13. The method of claim 11, wherein the imaging the unstained surface comprises capturing a macro image.

14. The method of claim 11, wherein the at least a marking device further comprises a fixed stylus.

15. The method of claim 13, further comprising relating, using the at least a computing device, the high magnification image to the macro image.

16. The method of claim 15, wherein relating the high magnification image to the macro image further comprises:
   locating at least a fiducial on a calibration slide using high magnification;
   locating the at least a fiducial on the calibration slide using macro magnification; and
   computing a mapping function from high magnification to macro magnification using the location of the at least a fiducial at the high magnification and at the macro magnification.

17. The method of claim 16, wherein the macro to robotic coordinates calibration further comprises:
   employing the manipulator equipped with a pen to mark a known geometry on a calibration slide in the robot coordinates;
   relocating the marked calibration slide using the manipulator to a macro imaging location within the marking station;
   identifying the known geometry on the marked calibration slide via macro imaging; and
   determining the mapping function based on the location of the geometry in both the robot and macro image coordinates, thereby correlating macro image coordinates to robot coordinates.

18. The method of claim 11, wherein determining the geometric registration comprises:
   identifying a target area from the stained slide image corresponding to the at least a targeted cell type;
   locating the at least a targeted cell type within the image of the unstained surface, as a function of the stained slide image; and
   determining the annotation mask, as a function of the location of the at least a targeted cell type within the image of the unstained surface.

19. The method of claim 11, further comprising harvesting at least a targeted cell type from the sample that comprises a tissue paraffin block.

20. The method of claim 19, further comprising extracting, using a tissue section device, the marked region of interest from the tissue paraffin block.

* * * * *